(12) United States Patent
Park

(10) Patent No.: US 12,062,825 B2
(45) Date of Patent: Aug. 13, 2024

(54) ELECTROCHEMICAL DEVICE

(71) Applicants: Hyundai Motor Company, Seoul (KR); Kia Corporation, Seoul (KR)

(72) Inventor: Joon Guen Park, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 43 days.

(21) Appl. No.: 17/544,137

(22) Filed: Dec. 7, 2021

(65) Prior Publication Data

US 2022/0416282 A1    Dec. 29, 2022

(30) Foreign Application Priority Data

Jun. 28, 2021  (KR) .................. 10-2021-0084301

(51) Int. Cl.
| | |
|---|---|
| *H01M 8/1006* | (2016.01) |
| *H01M 8/023* | (2016.01) |
| *H01M 8/0258* | (2016.01) |
| *H01M 8/2484* | (2016.01) |

(52) U.S. Cl.
CPC ......... *H01M 8/1006* (2013.01); *H01M 8/023* (2013.01); *H01M 8/0258* (2013.01); *H01M 8/2484* (2016.02)

(58) Field of Classification Search
CPC .. H01M 8/1006; H01M 8/2484; H01M 8/023; H01M 8/0258
See application file for complete search history.

(56) References Cited

U.S. PATENT DOCUMENTS

| | | | | |
|---|---|---|---|---|
| 2004/0151954 A1* | 8/2004 | Ooma | ................. | H01M 8/2465 429/456 |
| 2006/0099479 A1* | 5/2006 | Friedman | ............ | H01M 8/0273 429/510 |
| 2006/0240308 A1* | 10/2006 | Formanski | .......... | H01M 8/0265 429/514 |
| 2009/0092872 A1* | 4/2009 | Miyazawa | .......... | H01M 8/0258 228/164 |

FOREIGN PATENT DOCUMENTS

JP    H07-249419 A    9/1995

\* cited by examiner

*Primary Examiner* — Karie O'Neill Apicella
(74) *Attorney, Agent, or Firm* — MORGAN, LEWIS & BOCKIUS LLP

(57) ABSTRACT

An electrochemical apparatus includes a reaction layer including a membrane electrode assembly (MEA); and separators respectively stacked on two opposite surfaces of the reaction layer, wherein each separator includes first channels disposed on a first surface thereof and second channels disposed on a second surface thereof, in which the separators are disposed such that the first channels or the second channels thereof face each other with the reaction layer interposed therebetween, simplifying a structure and a manufacturing process.

13 Claims, 12 Drawing Sheets

ELECTROCHEMICAL DEVICE

CROSS-REFERENCE TO RELATED APPLICATION

The present application claims priority to Korean Patent Application No. 10-2021-0084301 filed on Jun. 28, 2021, the entire contents of which is incorporated herein for all purposes by this reference.

BACKGROUND OF THE INVENTION

Field of the Invention

The present invention relates to an electrochemical device, and more particularly, to an electrochemical apparatus which may have a simple structure and be manufactured by a simplified manufacturing process.

Description of Related Art

There is a consistently increasing demand for research and development on alternative energy to cope with global warming and depletion of fossil fuel. Hydrogen energy is attracting attention as a practical solution for solving environment and energy issues.

Because hydrogen has high energy density and properties suitable for application in a grid-scale, hydrogen is in the limelight as a future energy carrier.

A water electrolysis stack, which is one of electrochemical devices, refers to a device that produces hydrogen and oxygen by electrochemically decomposing water. The water electrolysis stack may be configured by stacking several tens or several hundreds of water electrolysis cells (unit cells) in series.

The water electrolysis cell may include a membrane electrode assembly (MEA) and separators (an anode separator and a cathode separator) disposed on two opposite sides of the membrane electrode assembly.

Meanwhile, to simplify a structure of the water electrolysis stack and reduce a weight of the water electrolysis stack, it is necessary to simplify a structure of the separator and minimize the number of separators to be used.

However generally, it is necessary to individually manufacture the separator (the anode separator) for defining a channel through which water flows, and the separator (the cathode separator) for defining a channel through which hydrogen flows. As a result, there is a problem in that the structure and the manufacturing process are complicated and the productivity and the production efficiency deteriorate.

Generally, the two separators (the anode separator and the cathode separator) having different structures need to be stacked between the membrane electrode assemblies that form the adjacent unit cells (water electrolysis cells). As a result, there is a problem in that it is difficult to simplify the structure and the manufacturing process and reduce the weight.

Moreover, electrons generated in the water electrolysis stack move along each separator. Generally, contact resistance increases because the two separators are stacked to be in close contact with each other. As a result, there is a problem in that the increase in contact resistance decreases the mobility of the electrons and degrades the efficiency of the water electrolysis stack.

Therefore, recently, various studies have been conducted to simplify the structure of the electrochemical device and the process of manufacturing the electrochemical device, but the study results are still insufficient. Accordingly, there is a need to develop a technology to simplify the structure of the electrochemical device and the process of manufacturing the electrochemical device.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an electrochemical apparatus which may have a simple structure and be manufactured by a simplified manufacturing process.

The present invention, in various aspects thereof, has also been made in an effort to implement both a cathode separator and an anode separator using a single type of separator having the same structure.

The present invention, in various aspects thereof, has also been made in an effort to reduce a weight of a product, miniaturize the product, and reduce manufacturing costs.

The present invention, in various aspects thereof, has also been made in an effort to minimize a position deviation of a separator and improve safety and reliability.

The present invention, in various aspects thereof, has also been made in an effort to improve structural rigidity of a separator and minimize deformation of and damage to each separator.

The present invention, in various aspects thereof, has also been made in an effort to inhibit occurrence of contact resistance of a separator and improve mobility of electrons and efficiency.

The present invention, in various aspects thereof, has also been made in an effort to inhibit deformation of and damage to a sealing member and ensure sealability.

The objects to be achieved by the exemplary embodiments are not limited to the above-mentioned objects, but also include objects or effects which may be understood from the solutions or embodiments described below.

Various aspects of the present invention provide an electrochemical apparatus including: a reaction layer including a membrane electrode assembly (MEA); and separators respectively stacked on two opposite surfaces of the reaction layer, wherein each separator includes first channels disposed on a first surface thereof and second channels disposed on a second surface thereof, in which the separators are disposed such that the first channels or the second channels thereof face each other with the reaction layer interposed therebetween.

This is to simplify a structure of the electrochemical apparatus and a process of manufacturing the electrochemical device.

That is, generally, it is necessary to individually manufacture the separator (e.g., the anode separator) for defining a channel through which water flows, and the separator (e.g., the cathode separator) for defining a channel through which hydrogen flows. As a result, there is a problem in that the structure and the manufacturing process are complicated and the productivity and the production efficiency deteriorate.

Generally, the two separators (e.g., the anode separator and the cathode separator) having different structures need to be stacked between the membrane electrode assemblies that form the adjacent unit cells (water electrolysis cells). As a result, there is a problem in that it is difficult to simplify the structure and the manufacturing process and reduce the overall weight of the electrochemical device.

Moreover, the electrons generated from the electrochemical apparatus move along each separator. Generally, contact resistance increases because the two separators are stacked to be in close contact with each other. As a result, there is a problem in that the increase in contact resistance decreases the mobility of the electrons and degrades the efficiency of the electrochemical device.

However, according to the exemplary embodiment of the present invention, the first channels are disposed on the first surface of each separator, and the second channels are disposed on the second surface of each separator. Therefore, only the single separator is configured as the cathode separator and the anode separator without stacking the two different separators (bringing the two different separators into close contact with each other). Therefore, in comparison with the case in the related art in which two types of separators are used, the use of the single type of separator makes it possible to obtain an advantageous effect of simplifying the structure and the manufacturing process and reducing the overall weight of the electrochemical device.

Moreover, in the exemplary embodiment of the present invention, since only the single separator may be disposed between the adjacent reaction layers, it is possible to basically prevent the occurrence of contact resistance caused by the contact between the separators. Therefore, it is possible to obtain an advantageous effect of ensuring the mobility of the electrons in the electrochemical apparatus and improving the efficiency of the electrochemical device.

Furthermore, in the exemplary embodiment of the present invention, the separators are stacked on the two opposite surfaces of the reaction layer such that the first channels (or the second channels) face each other with the reaction layer interposed therebetween. Therefore, it is possible to implement both the cathode separator and the anode separator using the single type of separator (the separator having the same structure) and ensure the structural rigidity of each separator.

That is, in the exemplary embodiment of the present invention, the separators are respectively stacked on the two opposite surfaces of the reaction layer, and the first surface (or the other surface) of each of the separators faces the reaction layer. Therefore, it is possible to sufficiently ensure an area of each of the separators (the separators respectively disposed on the upper and lower portions of the reaction layer) to which the fastening pressure is applied. Therefore, it is possible to ensure the structural rigidity of the separator and inhibit deformation of and damage to each separator.

The first channel and the second channel may be provided in various ways in accordance with required conditions and design specifications.

For example, the separator may include: a first protrusion pattern protruding from the second surface of each separator; and a second protrusion pattern protruding from the first surface of each separator, the first channels may be defined in the first protrusion pattern, and the second channels may be defined in the second protrusion pattern.

The first protrusion pattern and the second protrusion pattern may be integrated with the separator by partially processing (e.g., pressing) a part of each separator.

The first protrusion pattern may be disposed in an external region of the second protrusion pattern so as not to overlap the second protrusion pattern.

For example, the first protrusion pattern and the second protrusion pattern may be disposed alternately in a predetermined reference direction to define a continuous waveform cross-section.

Since the first protrusion pattern and the second protrusion pattern do not overlap each other as described above, the first protrusion pattern and the second protrusion pattern may be provided together or simultaneously on the first surface and the second surface of the separator by the press processing.

According to the exemplary embodiment of the present invention, the separators may be disposed such that the first channels or the second channels overlap each other with the reaction layer interposed therebetween.

Since the first channels (or the second channels) of the separators respectively disposed on the upper and lower portions of the reaction layer overlap each other as described above, the fastening pressure may be applied to the same position of the separators disposed on the upper and lower portions of the reaction layer. Therefore, it is possible to obtain an advantageous effect of more effectively inhibiting deformation of and damage to the separator caused by the fastening pressure.

According to the exemplary embodiment of the present invention, the separator may include a plurality of manifold flow paths provided at one end portion and the other end portion of the separator with the first channels or the second channels interposed therebetween.

As various exemplary embodiments of the present invention, the plurality of manifold flow paths may be symmetric with respect to a vertical reference line passing through a center portion of each separator.

As described above, since the plurality of manifold flow paths is symmetric with respect to the vertical reference line passing through the center portion of the separator, the position of the manifold flow path may be constantly maintained even though the first surface (or the other surface) of the separator is inverted (rotated by 180 degrees) based on the vertical line to serve as the cathode separator or the anode separator. In other words, the position of the manifold flow path may be constantly maintained regardless of the situation in which the first surface of the separator is configured as the anode separator or the cathode separator.

As various exemplary embodiments of the present invention, the plurality of manifold flow paths may be symmetric with respect to a horizontal reference line passing through a center portion of each separator.

As described above, since the plurality of manifold flow paths is symmetric with respect to the horizontal reference line passing through the center portion of the separator, the position of the manifold flow path may be constantly maintained even though the first surface (or the other surface) of the separator is inverted (rotated by 180 degrees) based on the horizontal line to serve as the cathode separator or the anode separator.

According to the exemplary embodiment of the present invention, the electrochemical apparatus may include: a first branch flow path protrusion pattern disposed on the first surface of the separator and configured to define first branch flow paths between the first channels and the manifold flow paths; and a second branch flow path protrusion pattern disposed on the second surface of the separator and configured to define second branch flow paths between the second channels and the manifold flow paths.

The first branch flow path protrusion pattern may be disposed in an external region of the second branch flow path protrusion pattern so as not to overlap the second branch flow path protrusion pattern.

Since the first branch flow path protrusion pattern and the second branch flow path protrusion pattern do not overlap each other as described above, the first branch flow path protrusion pattern and the second branch flow path protrusion pattern may be provided together or simultaneously on the first surface and the second surface of the separator by the press processing.

According to the exemplary embodiment of the present invention, the electrochemical apparatus may include a sealing part configured to seal a portion between the reaction layer and each separator.

The sealing part may have various structures configured for sealing the portion between the reaction layer and each separator.

For example, the sealing part may include: a first sealing member provided around the manifold flow paths, disposed on the first surface of each separator, and having an entrance/exit port; a second sealing member provided around the manifold flow paths and disposed on the second surface of each separator; a first edge sealing member provided along an edge portion of each separator and disposed on the first surface of each separator; and a second edge sealing member provided along the edge portion of each separator and disposed on the second surface of each separator.

According to the exemplary embodiment of the present invention, the electrochemical apparatus may include a support part disposed on each separator and configured to support the sealing part with respect to each separator.

Since the support part is provided as described above, the arrangement state of the sealing part may be stably maintained even though a pressure (e.g., a water supply pressure or a fastening pressure) applied to the sealing part increases. Therefore, it is possible to obtain an advantageous effect of minimizing the withdrawal and deformation of the sealing part and improving the safety and reliability.

The support part may have various structures configured for supporting the sealing part.

For example, the support part may include: a first support protrusion disposed on the first surface of each separator and configured to support the first sealing member; a second support protrusion disposed on the second surface of each separator and configured to support the second sealing member; a first edge support protrusion disposed on the first surface of each separator and configured to support the first edge sealing member; and a second edge support protrusion disposed on the second surface of each separator and configured to support the second edge sealing member.

According to the exemplary embodiment of the present invention, the electrochemical apparatus may include: a first seating groove which is provided in the first support protrusion and in which the first sealing member is accommodated; a second seating groove which is provided in the second support protrusion and in which the second sealing member is accommodated; a first edge seating groove which is provided in the first edge support protrusion and in which the first edge sealing member is accommodated; and a second edge seating groove which is provided in the second edge support protrusion and in which the second edge sealing member is accommodated.

The first support protrusion may be disposed in an external region of the second support protrusion so as not to overlap the second support protrusion, and the first edge support protrusion may be disposed in an external region of the second edge support protrusion so as not to overlap the second edge portion support protrusion.

As described above, the first support protrusion does not overlap the second support protrusion, and the first edge support protrusion does not overlap the second edge portion support protrusion. Therefore, the first support protrusion, the first edge portion support protrusion, the second support protrusion, and the second edge support protrusion may be provided together or simultaneously on the first surface and the second surface of the separator by the press processing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
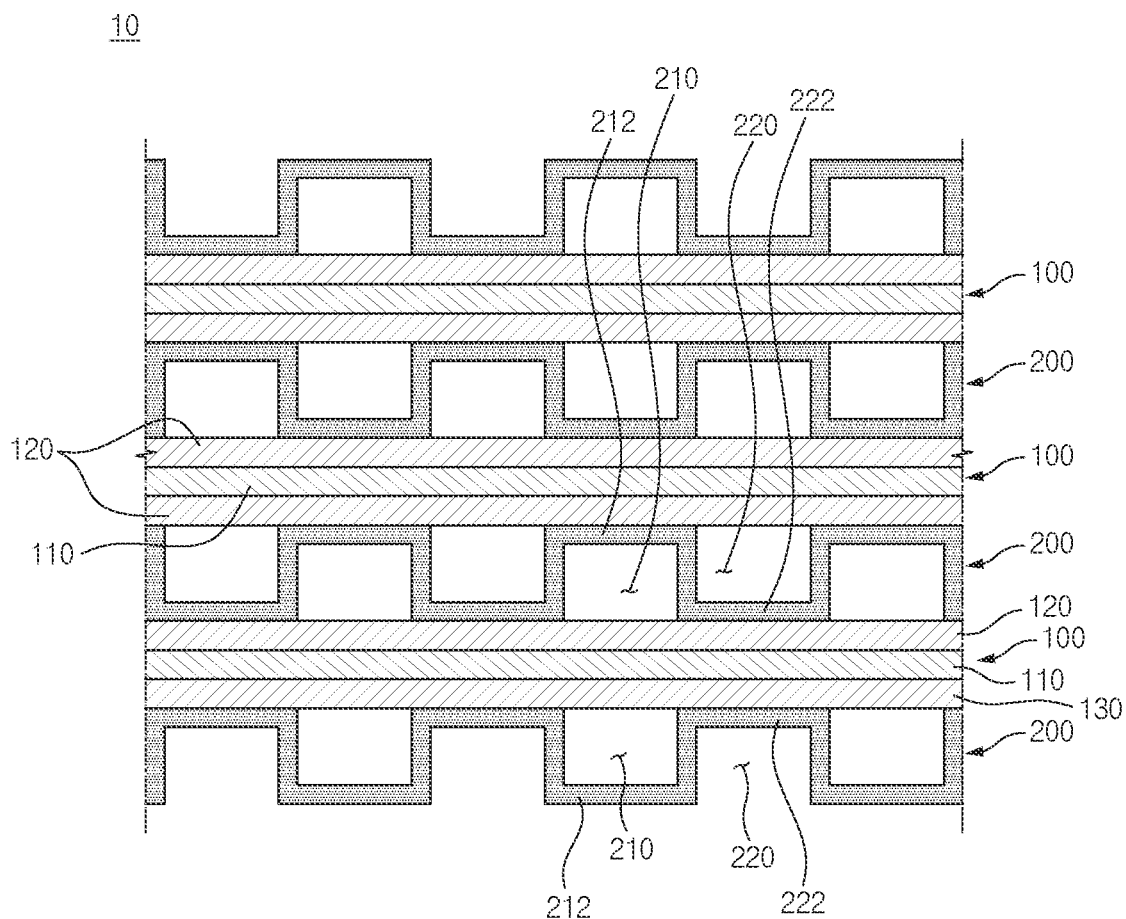
FIG. 1 is a view for explaining an electrochemical device according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

However, the technical spirit of the present invention is not limited to various exemplary embodiments described herein but may be implemented in various different forms. One or more of the constituent elements in the exemplary embodiments may be selectively combined and substituted for use within the scope of the technical spirit of the present invention.

Furthermore, unless otherwise specifically and explicitly defined and stated, the terms (including technical and scientific terms) used in the exemplary embodiments of the present invention may be construed as the meaning which may be commonly understood by the person with ordinary skill in the art to which various exemplary embodiments of the present invention pertains. The meanings of the commonly used terms such as the terms defined in dictionaries may be interpreted in consideration of the contextual meanings of the related technology.

Furthermore, the terms used in the exemplary embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that may be made by combining A, B, and C.

In addition, the terms such as first, second, A, B, (a), and (b) may be used to describe constituent elements of the exemplary embodiments of the present invention.

These terms are used only for discriminating one constituent element from another constituent element, and the nature, the sequences, or the orders of the constituent elements are not limited by the terms.

Furthermore, when one constituent element is referred to as being 'connected', 'coupled', or 'attached' to another constituent element, one constituent element may be connected, coupled, or attached directly to another constituent element or connected, coupled, or attached to another constituent element through yet another constituent element interposed therebetween.

Furthermore, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIG. 1, FIG. 2, FIG. 3, FIG. 4, FIG. 5, FIG. 6, FIG. 7, FIG. 8, FIG. 9, FIG. 10, FIG. 11 and FIG. 12, an electrochemical device 10 includes: reaction layers 100 each including a membrane electrode assembly (MEA) 110; and separators 200 respectively stacked on two opposite surfaces of the reaction layer 100 and each including first channels 210 disposed on one surface 200a thereof and second channels 220 disposed on the other surface 200b thereof. The separators 200 are disposed such that the first channels 210 or the second channels 220 face each other with the reaction layer 100 interposed therebetween.

For reference, the electrochemical device 10 according to the exemplary embodiment of the present invention may be used to generate electrochemical reactions between various reaction fluids in accordance with required conditions and design specifications. The present invention is not restricted or limited by the type and property of the reaction fluid used for the electrochemical device 10.

For example, the electrochemical device 10 according to the exemplary embodiment of the present invention may be used as a water electrolysis stack that produces hydrogen and oxygen by decomposing water through an electrochemical reaction.

The water electrolysis stack may be configured by stacking a plurality of unit cells in a reference stacking direction (e.g., an upward/downward direction based on FIG. 1).

The unit cell may include the reaction layer 100 and the separators 200 stacked on the two opposite surfaces of the reaction layer 100. The water electrolysis stack may be configured by stacking the plurality of unit cells in the reference stacking direction and assembling endplates with two opposite end portions of the plurality of unit cells.

The reaction layer 100 may have various structures configured for generating the electrochemical reaction of the reaction fluid (e.g., water). The present invention is not restricted or limited by the type and structure of the reaction layer 100.

For example, the reaction layer 100 may include the membrane electrode assembly (MEA) 110, a gas diffusion layer 120 being in close contact with one surface 200a of the membrane electrode assembly 110, and a porous transport layer 130 being in close contact with the other surface 200b of the membrane electrode assembly 110.

The membrane electrode assembly 110 may be variously changed in structure and material in accordance with required conditions and design specifications, and the present invention is not limited or restricted by the structure and material of the membrane electrode assembly 110.

For example, the membrane electrode assembly 110 may be configured by attaching catalyst electrode layers (e.g., an anode electrode layer and a cathode electrode layer), in which electrochemical reactions are generated, to two opposite surfaces of an electrolyte membrane.

The gas diffusion layer 120 and the porous transport layer 130 uniformly distribute the reaction fluid and may each have a porous structure having pores with predetermined sizes.

For reference, water supplied to an anode electrode layer, which is an oxidation electrode for the water electrolysis, is divided into hydrogen ions (protons), electrons, and oxygen. The hydrogen ions move to a cathode electrode layer, which is a reduction electrode, through the electrolyte membrane, and the electrons move to the cathode through an external circuit. Furthermore, the oxygen may be discharged to an anode outlet, and the hydrogen ions and the electrons may be converted into hydrogen at the cathode.

Referring to FIG. 1, FIG. 2, FIG. 3, FIG. 4, and FIG. 5, the separators 200, together with the reaction layer 100, form a single unit cell (water electrolysis cell). The separators 200 are configured to block hydrogen and water separated by the reaction layer 100 and ensure flow paths (flow fields) through which hydrogen and water flow.

Furthermore, the separators 200 may also be configured to distribute heat, which is generated in the unit cell, to the entire unit cell, and the excessively generated heat may be discharged to the outside by water (coolant) flowing along the separators 200.

For reference, in the exemplary embodiment of the present invention, the separators 200 include both the anode separator and the cathode separator that independently define the flow paths (channels) for water and air in the water electrolysis stack.

The first channels 210 are disposed on one surface 200a of the separator 200, and the second channels 220 are disposed on the other surface 200b of the separator 200.

The first channel 210 and the second channel 220 define the reaction regions for the electrochemical reactions.

The first channel 210 may be any one of the anode channel and the cathode channel, and the second channel 220 may be the other of the anode channel and the cathode channel. For example, the first channel 210 may be the anode channel, and the second channel 220 may be the cathode channel.

The separator 200 may have various structures having the first channels 210 and the second channels 220 and may be made of various materials. The present invention is not restricted or limited by the structure and material of the separator 200.

For example, the separator 200 may be provided in a form of an approximately quadrangular plate. The first channels 210 and the second channels 220 may be disposed at an approximate center portion of the separator 200. According to various exemplary embodiments of the present invention, the separator may have a circular shape or other shapes.

According to the exemplary embodiment of the present invention, the separator 200 may be made of a thin film metal material (e.g., titanium, stainless steel, Inconel, or aluminum). According to various exemplary embodiments of the present invention, the separator may be made of another material such as graphite or a carbon composite.

Figure 5:
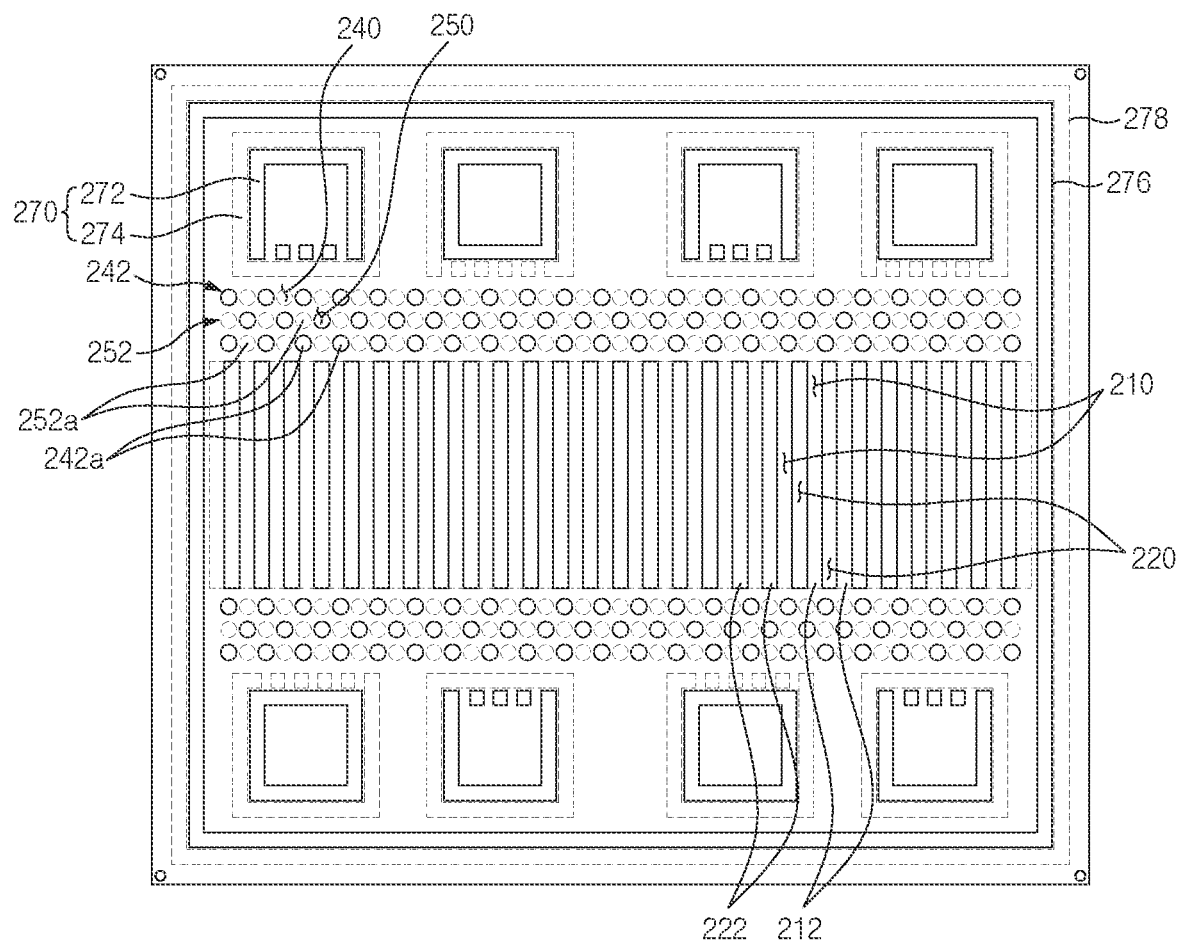
FIG. 5 is a view for explaining a structure in which the first channels and the second channels are disposed in the electrochemical device according to the exemplary embodiment of the present invention.
Figure 6:
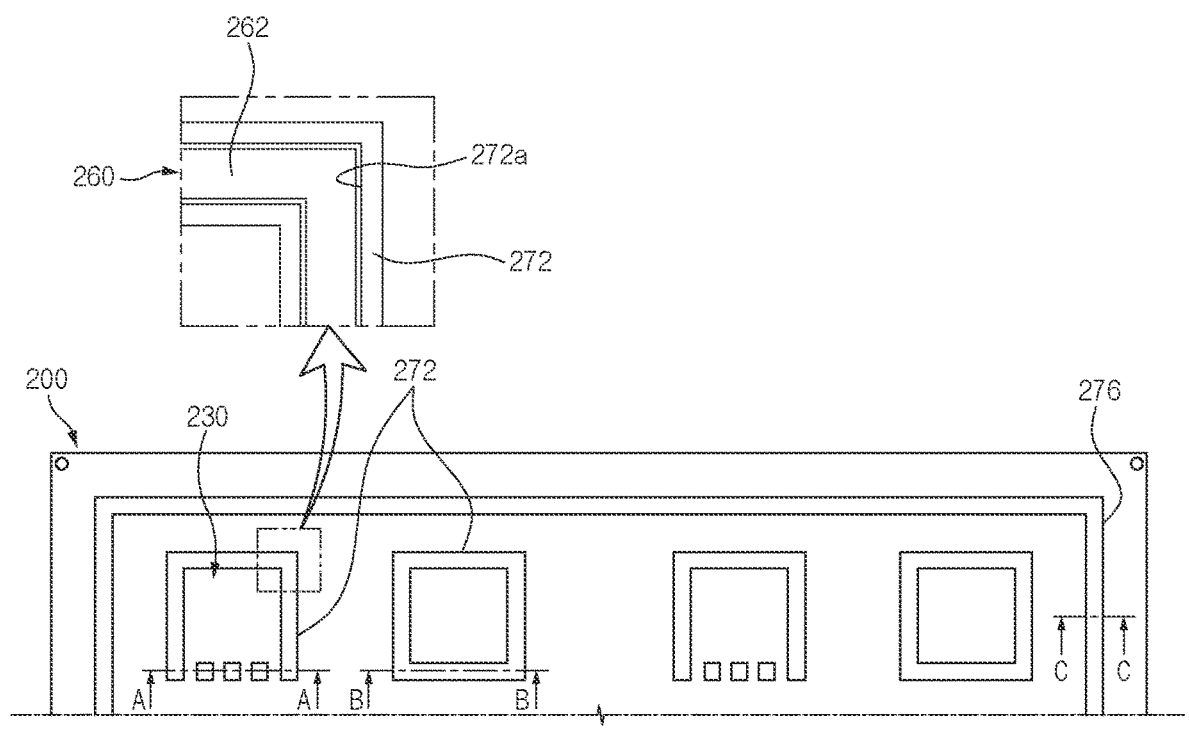
FIG. 6 is a view for explaining a manifold flow path of the electrochemical device according to the exemplary embodiment of the present invention.

According to the exemplary embodiment of the present invention, the first channel 210 and the second channel 220 may be provided straight in a preset direction (e.g., in the upward/downward direction based on FIG. 5).

According to various exemplary embodiments of the present invention, the first channel and the second channel may be inclined with respect to the preset direction. Alternatively, the first channel and the second channel may each have a curved shape.

The first channel 210 and the second channel 220 may be provided in various ways in accordance with required conditions and design specifications.

For example, the separator 200 may include a first protrusion pattern 212 protruding from the other surface 200b of the separator 200 in a thickness direction TD of the separator 200 (in the upward/downward direction based on FIG. 2), and a second protrusion pattern 222 protruding from one surface 200a of the separator 200 in the thickness direction TD of the separator 200. The first channels 210 may be defined in the first protrusion pattern 212, and the second channels 220 may be defined in the second protrusion pattern 222.

The first protrusion pattern 212 and the second protrusion pattern 222 may be integrated with the separator 200 by partially processing (e.g., pressing) a part of the separator 200.

The first channel 210 may be defined in the first protrusion pattern 212, protruding from the other surface 200b of the separator 200, by pressing one surface 200a of the separator 200. The second channel 220 may be defined in the second protrusion pattern 222, protruding from one surface 200a of the separator 200, by pressing the other surface 200b of the separator 200.

The first protrusion pattern 212 is disposed in an external region of the second protrusion pattern 222 so as not to overlap the second protrusion pattern 222.

In the instant case, the configuration in which the first protrusion pattern 212 is disposed in the external region of the second protrusion pattern 222 so as not to overlap the second protrusion pattern 222 may mean that the first protrusion pattern 212 is disposed in the region between the adjacent second protrusion patterns 222 (or the second protrusion pattern is disposed in the region between the adjacent first protrusion patterns) such that the first protrusion pattern 212 and the second protrusion pattern 222 do not overlap each other (e.g., the first protrusion pattern and the second protrusion pattern do not overlap each other in a plan view based on FIG. 5).

For example, the first protrusion pattern 212 and the second protrusion pattern 222 may be disposed alternately in a predetermined reference direction SD to define a continuous waveform cross-section.

According to various exemplary embodiments of the present invention, the first protrusion pattern and the second protrusion pattern may be disposed in an irregular order in the reference direction.

Since the first protrusion pattern 212 and the second protrusion pattern 222 do not overlap each other as described above, the first protrusion pattern 212 and the second protrusion pattern 222 may be provided together or simultaneously on one surface 200a and the other surface 200b of the separator 200 by the press processing.

The separators 200 are respectively stacked on the two opposite surfaces of the reaction layer 100 such that the first channels 210 (or the second channels) face each other with the reaction layer 100 interposed therebetween.

Figure 2:
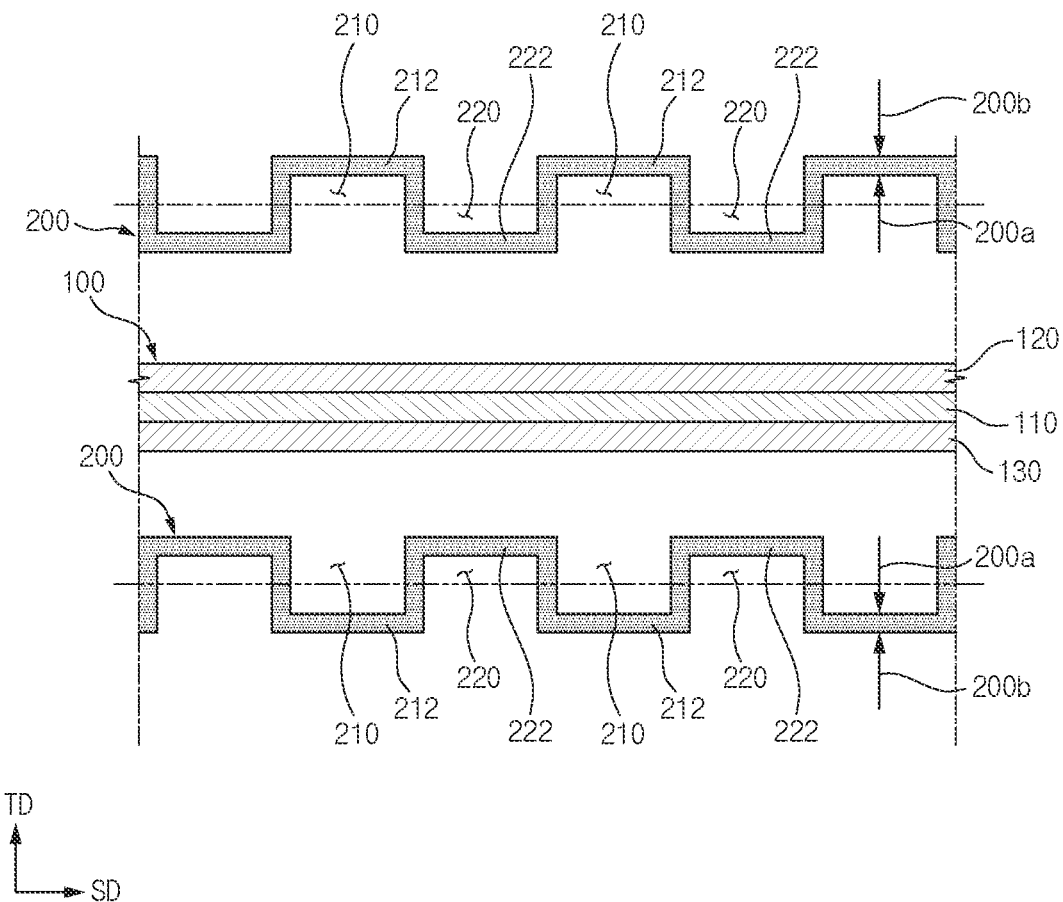
FIG. 2 is a view for explaining separators of the electrochemical device according to the exemplary embodiment of the present invention.
Figure 3:
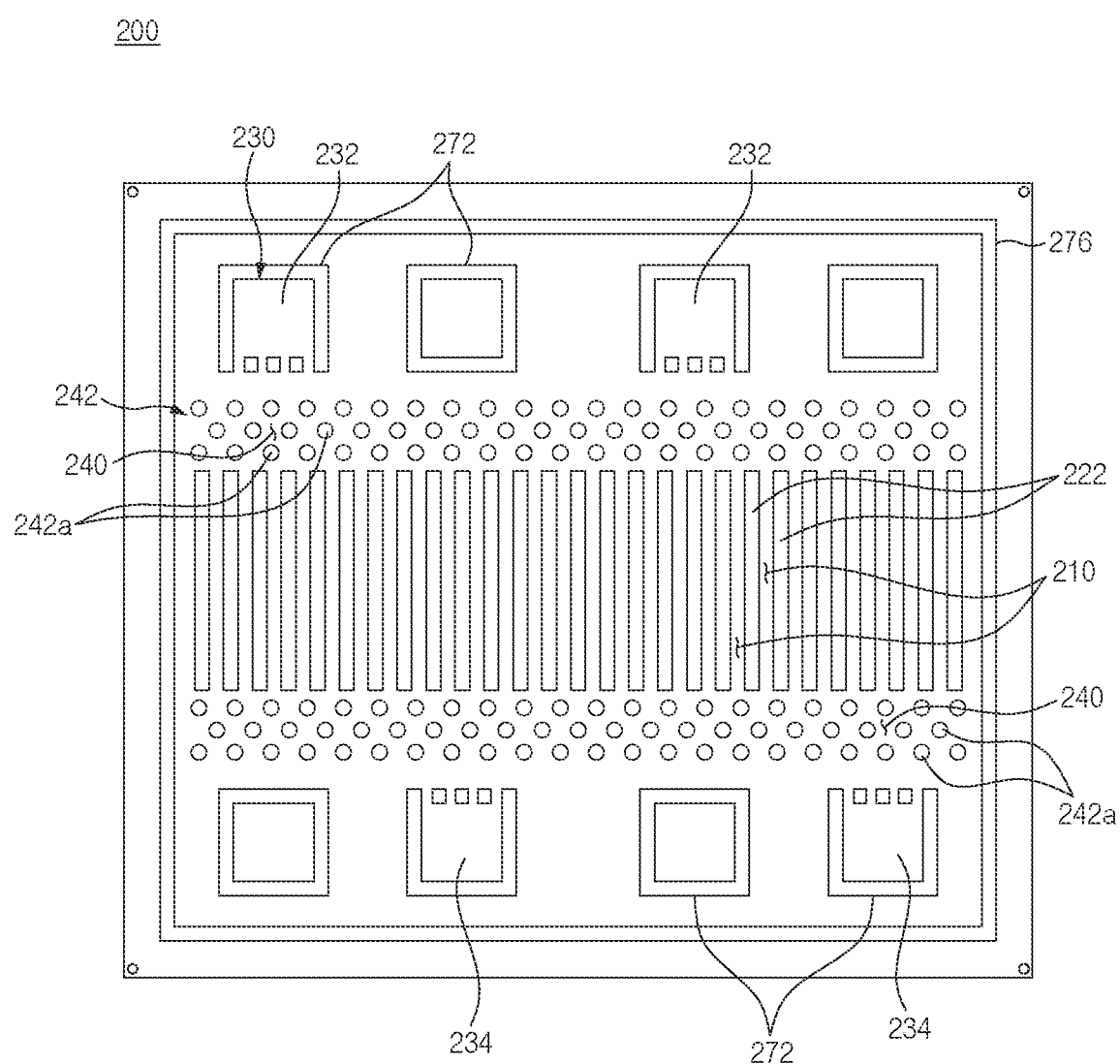
FIG. 3 is a top plan view for explaining first channels of the electrochemical device according to the exemplary embodiment of the present invention.
Figure 4:
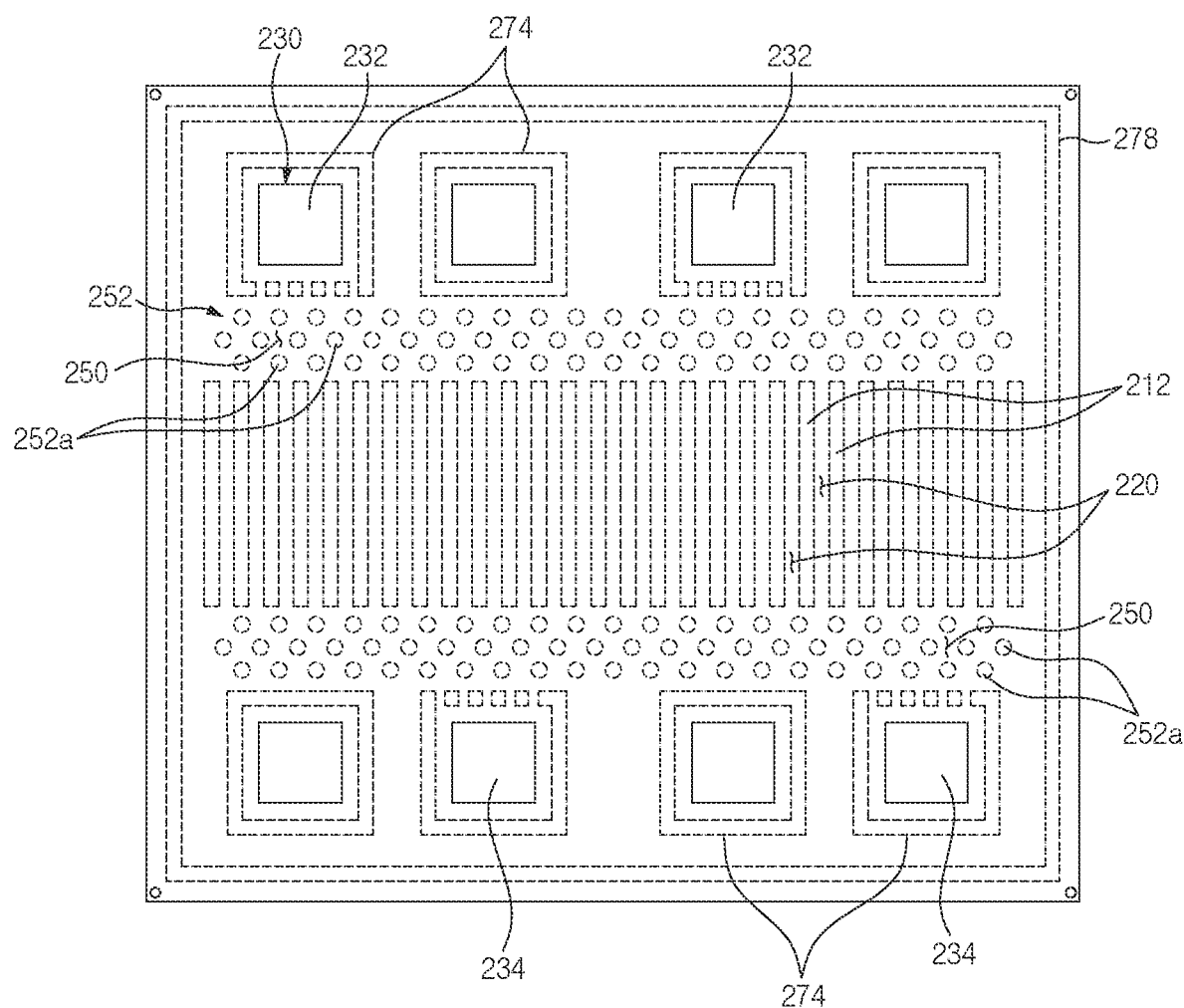
FIG. 4 is a view for explaining second channels of the electrochemical device according to the exemplary embodiment of the present invention.

For example, referring to FIG. 1 and FIG. 2, the separators 200 having the same structure are respectively stacked on the upper and lower portions of the reaction layer 100. The separator 200 disposed on the lower portion of the reaction layer 100 may be disposed such that one surface 200a (an upper surface based on FIG. 2) thereof faces a lower surface of the reaction layer 100. The separator 200 disposed on the upper portion of the reaction layer 100 may be disposed such that one surface 200a (a lower surface based on FIG. 2) thereof faces an upper surface of the reaction layer 100.

The separator 200 may be disposed between the adjacent reaction layers 100 and serve as the cathode separator or the anode separator. For example, water may flow along the first channel 210 provided between one surface 200a of the separator 200 and the lower surface of the reaction layer 100 (e.g., the reaction layer disposed at a center portion in FIG. 1), and hydrogen may flow along the second channel 220 provided between the other surface 200b of the separator 200 and the upper surface of the reaction layer 100 (e.g., the reaction layer disposed at a lowermost portion in FIG. 1).

The present configuration allows the single separator 200 to serve as both the cathode separator and the anode separator.

That is, generally, the cathode separator and the anode separator, which have different structures, need to be provided, and the two separators (the cathode separator and the anode separator) need to be stacked between the adjacent reaction layers, which makes it difficult to simplify the structure and the manufacturing process and reduce the overall weight of the electrochemical device.

Moreover, the electrons generated from the electrochemical device move along the separator. Generally, contact resistance increases because the two separators are stacked to be in close contact with each other between the adjacent reaction layers. As a result, there is a problem in that the increase in contact resistance decreases the mobility of the electrons and degrades the efficiency of the electrochemical device.

However, according to the exemplary embodiment of the present invention, the first channels 210 (e.g., the water channel) are disposed on one surface 200a of the separator 200, and the second channels 220 (e.g., the hydrogen channel) are disposed on the other surface 200b of the separator 200. Therefore, only the single separator 200 is configured as the cathode separator and the anode separator without stacking the two different separators 200 (bringing the two different separators 200 into close contact with each other). Therefore, it is possible to obtain an advantageous effect of simplifying the structure and the manufacturing process and reducing the overall weight of the electrochemical device 10.

Moreover, in the exemplary embodiment of the present invention, since only the single separator 200 may be disposed between the adjacent reaction layers 100, it is possible to basically prevent the occurrence of contact resistance caused by the contact between the separators 200. Therefore, it is possible to obtain an advantageous effect of ensuring the mobility of the electrons in the electrochemical device 10 and improving the efficiency of the electrochemical device 10.

Furthermore, in the exemplary embodiment of the present invention, the separators 200 are stacked on the two opposite surfaces of the reaction layer 100 such that the first channels 210 (or the second channels) face each other with the reaction layer 100 interposed therebetween. Therefore, it is possible to implement both the cathode separator and the anode separator using the single type of separator 200 (the separator 200 having the same structure) and ensure the structural rigidity of the separator 200.

This is to inhibit the separator 200 from being easily deformed or damaged when a fastening pressure (pressing force) is applied to the unit cell.

That is, in the exemplary embodiment of the present invention, the separators 200 are respectively stacked on the two opposite surfaces of the reaction layer 100, and one surface 200a (or the other surface) of each of the separators 200 faces the reaction layer 100. Therefore, it is possible to sufficiently ensure an area of each of the separators 200 (the separators respectively disposed on the upper and lower portions of the reaction layer) to which the fastening pressure is applied. Therefore, it is possible to ensure the structural rigidity of the separator 200 and inhibit deformation of and damage to the separator 200.

The area of the separator 200 to which the fastening pressure is applied may be a contact surface (land surface) of the first protrusion pattern 212 (or the second protrusion pattern) being in contact with the reaction layer 100.

The separators 200 are disposed such that the first channels 210 (or the second channels) overlap each other with the reaction layer 100 interposed therebetween.

In the instant case, the configuration in which the first channels 210 (or the second channels) overlap each other with the reaction layer 100 interposed therebetween may mean that the first protrusion patterns 212 (or the second protrusion patterns) of the separators 200 disposed on the upper and lower portions of the reaction layer 100 overlap each other in a plan view.

Since the first channels 210 (or the second channels) of the separators 200 respectively disposed on the upper and lower portions of the reaction layer 100 overlap each other as described above, the fastening pressure may be applied to the same position of the separators 200 disposed on the upper and lower portions of the reaction layer 100. Therefore, it is possible to obtain an advantageous effect of more effectively inhibiting deformation of and damage to the separator 200 caused by the fastening pressure.

For example, the fastening pressure may be applied to the first protrusion pattern 212 of the separator 200 disposed on the lower portion of the reaction layer 100, and the fastening pressure may also be applied to the first protrusion pattern 212 of the separator 200 disposed on the upper portion of the reaction layer 100. Since the same fastening pressure is applied to the same position (at which the separators 200 face each other) of the separators 200 disposed on the upper and lower portions of the reaction layer 100 as described above, it is possible to more effectively inhibit deformation of and damage to the separator 200 caused by the fastening pressure.

According to the exemplary embodiment of the present invention, the separator 200 may include a plurality of manifold flow paths 230 provided at one end portion and the other end portion of the separator 200 with the first channels 210 or the second channels 220 interposed therebetween.

The manifold flow path 230 is provided to supply/discharge water or hydrogen to/from the separator 200.

For example, the plurality of manifold flow paths 230 may be disposed at an upper side (based on FIG. 3) of the first channels 210 and spaced from one another in the horizontal direction, and the plurality of manifold flow paths 230 may be disposed at a lower side (based on FIG. 3) of the first channels 210 and spaced from one another in the horizontal direction.

Hereinafter, an example will be described in which four manifold flow paths 230 are disposed at the upper side of the first channels 210 and four manifold flow paths 230 are disposed at the lower side of the first channels 210. Furthermore, the present configuration may mean that the four manifold flow paths 230 are disposed at the upper side of the second channels 220, and the four manifold flow paths 230 are disposed at the lower side of the second channels 220.

The manifold flow path 230 may be variously changed in number and arrangement interval in accordance with required conditions and design specifications. The present invention is not restricted or limited by the number of manifold flow paths 230 and the arrangement intervals between the manifold flow paths 230.

The manifold flow path 230 may be variously changed in structure and shape in accordance with required conditions and design specifications. The present invention is not restricted or limited by the structure and shape of the manifold flow path 230.

The plurality of manifold flow paths 230 may penetrate the separator 200 and have the same size and shape.

For example, the plurality of manifold flow paths 230 may have quadrangular shapes with the same size. According to various exemplary embodiments of the present invention, the manifold flow path may have a circular shape or other shapes.

The manifold flow path 230 may allow water or hydrogen to flow into or out of the manifold flow path 230 depending on the purpose (e.g., the anode separator or the cathode separator) of the separator 200.

For example, in a case in which one surface 200a of the separator 200 is used as the anode separator, water may flow into at least one flow path (e.g., 232) of the plurality of manifold flow paths 230, and water may be discharged from another flow path 234 of the manifold flow paths 230.

In contrast, in a case in which one surface 200a of the separator 200 is used as the cathode separator, hydrogen may be discharged through at least one flow path (e.g., 232 or 234) of the manifold flow paths 230.

According to the exemplary embodiment of the present invention, the plurality of manifold flow paths 230 may be symmetric with respect to a vertical reference line (see VL in FIG. 10) that passes through the center portion of the separator 200.

This is based on the fact that one surface 200a of the separator 200 selectively is configured as the anode separator or the cathode separator. The position of the manifold flow path 230 may be constantly maintained regardless of the situation in which one surface 200a of the separator 200 is configured as the anode separator or the cathode separator.

Figure 10:
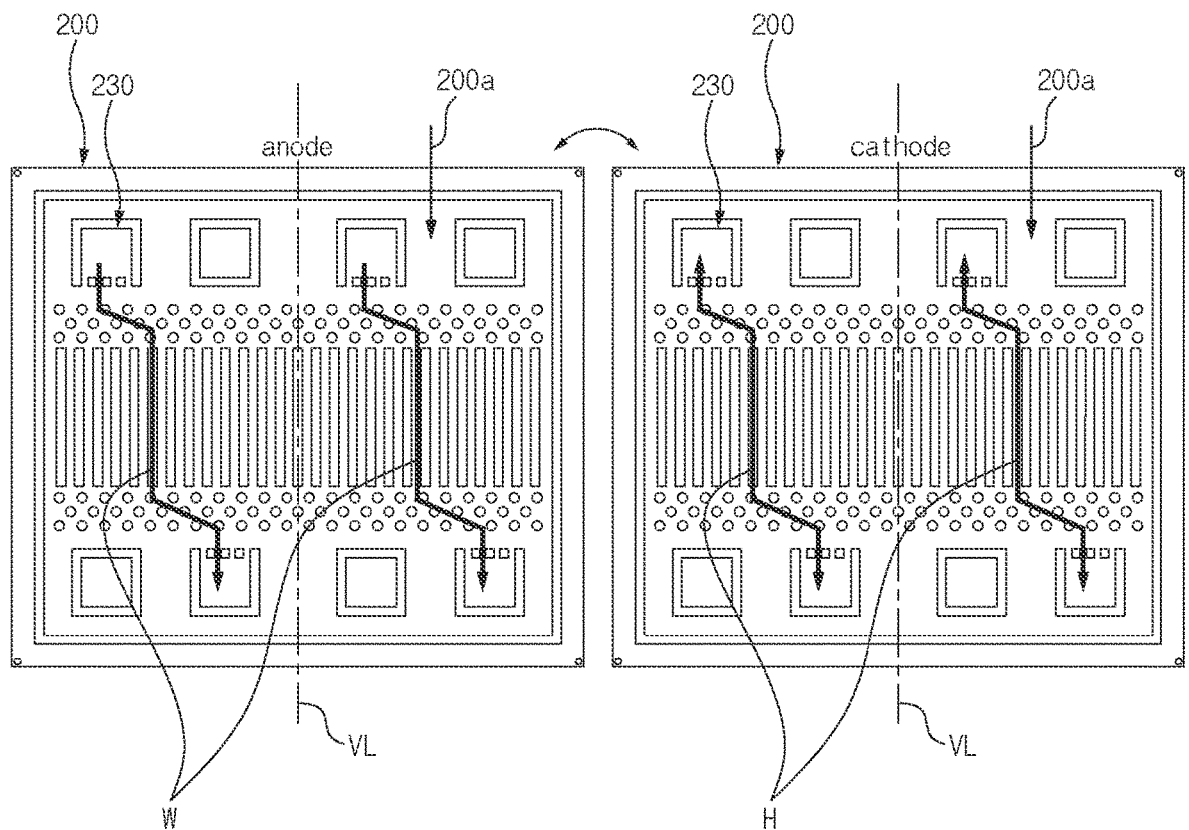
FIG. 10 is a view for explaining an application example of the separator of the electrochemical device according to the exemplary embodiment of the present invention.

Referring to FIG. 10, the two separators 200 having the same structure may be stacked on the two opposite surfaces of the reaction layer 100 with the reaction layer 100 interposed therebetween. One surface 200a of the left separator 200 (based on FIG. 10) is configured as the anode separator, and one surface 200a of the right separator 200 (based on FIG. 10) is configured as the cathode separator. The two separators 200 may overlap each other with the reaction layer 100 interposed therebetween such that one surface 200a of the left separator 200 and one surface 200a of the right separator 200 face and overlap each other in a direction from the left side to the right side thereof.

In the instant case, water W may flow in and out through the manifold flow path 230 disposed on the left separator 200, and hydrogen H may flow in and out through the manifold flow path 230 disposed on the right separator 200.

On the other hand, one surface 200a of the left separator 200 is configured as the cathode separator, and one surface 200a of the right separator 200 is configured as the anode separator. In the instant case, hydrogen may flow in and out through the manifold flow path 230 disposed on the left separator 200, and water may flow in and out through the manifold flow path 230 disposed on the right separator 200.

As described above, since the plurality of manifold flow paths 230 is symmetric with respect to the vertical reference line VL passing through the center portion of the separator 200, the position of the manifold flow path 230 may be constantly maintained even though one surface 200a (or the other surface) of the separator 200 is inverted (rotated by 180 degrees) based on the vertical line to serve as the cathode separator or the anode separator. In other words, the position of the manifold flow path 230 may be constantly maintained regardless of the situation in which one surface 200a of the separator 200 is configured as the anode separator or the cathode separator.

Figure 11:
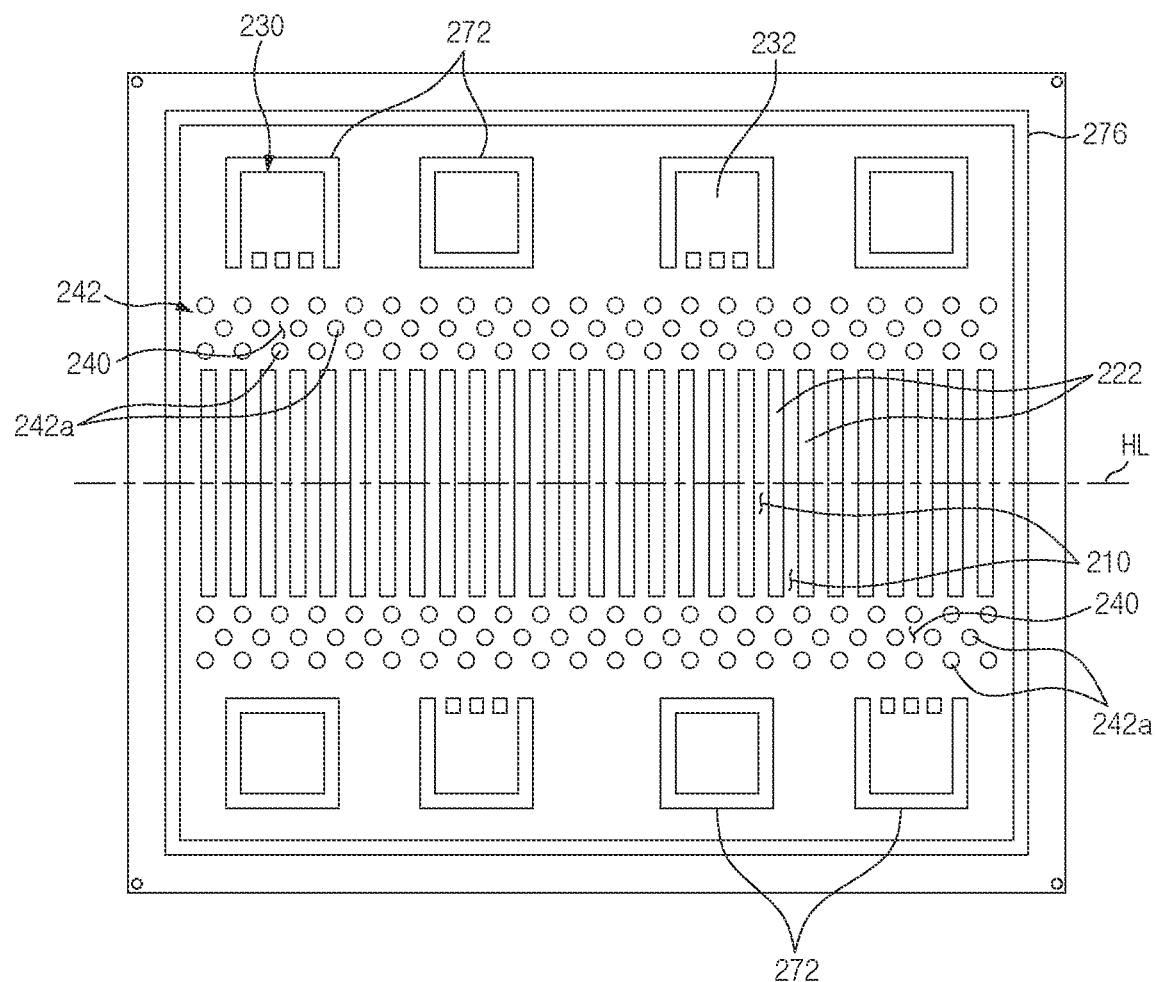
FIG. 11 and FIG. 12 are views for explaining modified examples of the separator of the electrochemical device according to the exemplary embodiment of the present invention.

According to various exemplary embodiments of the present invention, the plurality of manifold flow paths 230 may be symmetric with respect to a horizontal reference line HL passing through the center portion of the separator 200, as illustrated in FIG. 11.

As described above, since the plurality of manifold flow paths 230 is symmetric with respect to the horizontal reference line HL passing through the center portion of the separator 200, the position of the manifold flow path 230 may be constantly maintained even though one surface 200a (or the other surface) of the separator 200 is inverted (rotated by 180 degrees) based on the horizontal line to serve as the cathode separator or the anode separator.

Figure 12:
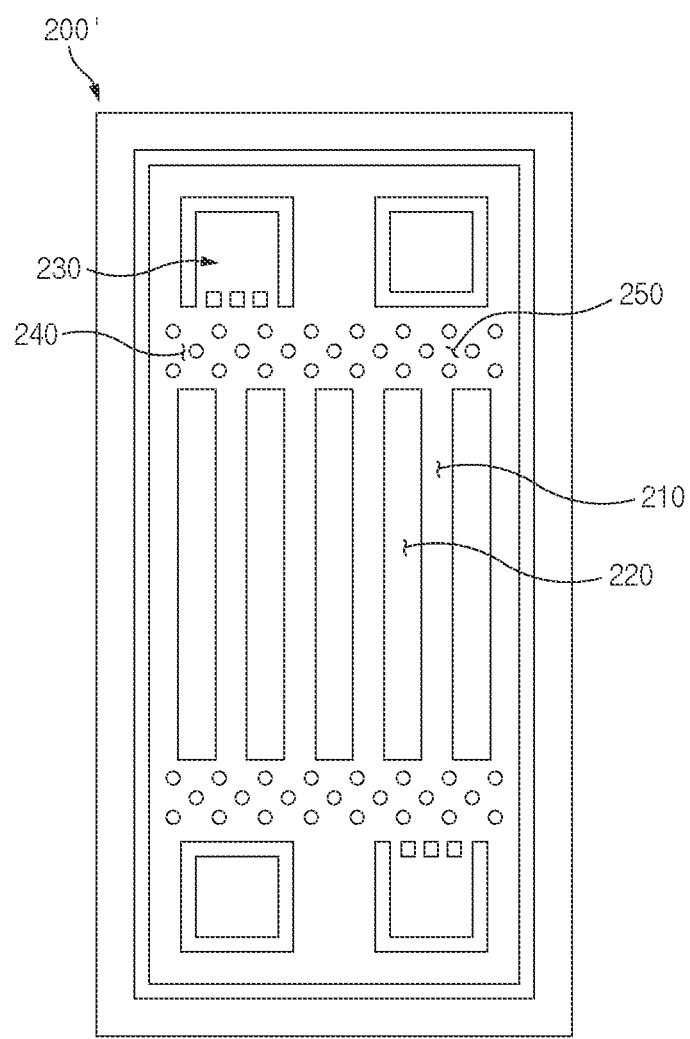

In the exemplary embodiment of the present invention illustrated and described above, the example has been described in which the four manifold flow paths 230 are disposed at the upper side of the first channels 210 (or the second channels) and the four manifold flow paths 230 are disposed at the lower side of the first channels 210 (or the second channels). However, according to various exemplary embodiments of the present invention, as illustrated in FIG. 12, two manifold flow paths 230 may be disposed at the upper side of the first channels 210 (or the second channels) and two manifold flow paths 230 may be disposed at the lower side of the first channels 210 (or the second channels).

Two or more manifold flow paths 230 may be respectively disposed at the upper and lower sides of the first channels 210 (or the second channels). This is based on the fact that one surface 200a of the separator 200 selectively is configured as the cathode separator or the anode separator. In the case in which one surface 200a of the separator 200 is configured as the anode separator, the manifold flow paths 230 need to be used as an inlet into which water is introduced and an outlet from which water is discharged. Therefore, at least two manifold flow paths 230 need to be respectively disposed at the upper and lower sides of the first channels 210 (or the second channels).

According to the exemplary embodiment of the present invention, the electrochemical device 10 may include: a first branch flow path protrusion pattern 242 disposed on one surface 200a of the separator 200 and configured to define first branch flow paths 240 between the first channels 210 and the manifold flow paths 230; and a second branch flow path protrusion pattern 252 disposed on the other surface 200b of the separator 200 and configured to define second branch flow paths 250 between the second channels 220 and the manifold flow paths 230.

The first branch flow path protrusion pattern 242 may have various structures configured for defining the first branch flow paths 240 between the first channels 210 and the manifold flow paths 230. The present invention is not restricted or limited by the structure of the first branch flow path protrusion pattern 242.

In the instant case, the first branch flow paths 240 may mean flow paths disposed between the first channels 210 and the manifold flow paths 230 and configured to uniformly distribute water or hydrogen to the first channels 210.

Since the first branch flow paths 240 are disposed between the first channels 210 and the manifold flow paths 230 as described above, it is possible to obtain an advantageous effect of minimizing a deviation of a flow rate of water or hydrogen to be supplied to (or discharged from) the respective first channels 210.

For example, the first branch flow path protrusion pattern 242 may include a plurality of first protrusions 242a spaced from one another at a uniform interval, and the first branch flow path 240 may be defined between the adjacent first protrusions 242a.

For example, the first protrusion 242a may have a circular cross-section. According to various exemplary embodiments of the present invention, the first protrusion may have a quadrangular cross-section or other cross-sectional shape.

The second branch flow path protrusion pattern 252 may have various structures configured for defining the second branch flow paths 250 between the second channels 220 and the manifold flow paths 230. The present invention is not restricted or limited by the structure of the second branch flow path protrusion pattern 252.

In the instant case, the second branch flow paths 250 may mean flow paths disposed between the second channels 220 and the manifold flow paths 230 and configured to uniformly distribute water or hydrogen to the second channels 220.

Since the second branch flow paths 250 are disposed between the second channels 220 and the manifold flow paths 230 as described above, it is possible to obtain an advantageous effect of minimizing a deviation of a flow rate of water or hydrogen to be supplied to (or discharged from) the respective second channels 220.

For example, the second branch flow path protrusion pattern 252 may include a plurality of second protrusions 252a spaced from one another at a uniform interval, and the second branch flow path 250 may be defined between the adjacent second protrusions 252a.

For example, the second protrusion 252a may have a circular cross-section. According to various exemplary embodiments of the present invention, the second protrusion may have a quadrangular cross-section or other cross-sectional shape.

The first branch flow path protrusion pattern 242 is disposed in an external region of the second branch flow path protrusion pattern 252 so as not to overlap the second branch flow path protrusion pattern 252.

In the instant case, the configuration in which the first branch flow path protrusion pattern 242 is disposed in the external region of the second branch flow path protrusion pattern 252 so as not to overlap the second branch flow path protrusion pattern 252 may mean that the first branch flow path protrusion pattern 242 is disposed in the region between the adjacent second branch flow path protrusion patterns 252 (or the second branch flow path protrusion pattern is disposed in the region between the adjacent first branch flow path protrusion patterns) such that the first branch flow path protrusion pattern 242 and the second branch flow path protrusion pattern 252 do not overlap each other (e.g., the first branch flow path protrusion pattern and the second branch flow path protrusion pattern do not overlap each other in a plan view based on FIG. 5).

Since the first branch flow path protrusion pattern 242 and the second branch flow path protrusion pattern 252 do not overlap each other as described above, the first branch flow path protrusion pattern 242 and the second branch flow path protrusion pattern 252 may be provided together or simultaneously on one surface 200a and the other surface 200b of the separator 200 by the press processing.

Meanwhile, in the exemplary embodiment of the present invention illustrated and described above, the example has been described in which the first channels 210 and the second channels 220 (the first protrusion pattern and the second protrusion pattern) are provided on the separator 200 by partially pressing a portion of the separator 200. However, according to various exemplary embodiments of the present invention, the first channels and the second channels may be provided on the separator by etching a portion of the separator.

Alternatively, the first channels and the second channels may be provided on the separator by cutting the surface of the separator by the cutting processing.

Likewise, the first branch flow path protrusion pattern and the second branch flow path protrusion pattern may be provided by etching or cutting processing.

Referring to FIG. 6, FIG. 7, FIG. 8, and FIG. 9, according to the exemplary embodiment of the present invention, the electrochemical device 10 may include a sealing portion 260 configured to seal a portion between the reaction layer 100 and the separator 200.

In the instant case, the configuration in which the portion between the reaction layer 100 and the separator 200 is sealed means that a portion between the reaction layer 100 and one surface 200a of the separator 200 is sealed and a portion between the reaction layer 100 and the other surface 200b of the separator 200 is sealed.

The sealing portion 260 may have various structures configured for sealing the portion between the reaction layer 100 and the separator 200.

For example, the sealing portion 260 may include: a first sealing member 262 provided around the manifold flow path 230, disposed on one surface 200a of the separator 200, and having entrance/exit ports 262a; a second sealing member 264 provided around the manifold flow path 230 and disposed on the other surface 200b of the separator 200; a first edge sealing member 266 provided along an edge portion of the separator 200 and disposed on one surface 200a of the separator 200; and a second edge sealing member 268 provided along the edge portion of the separator 200 and disposed on the other surface 200b of the separator 200.

For reference, the sealing portion 260 may be made of an elastic material such as rubber, silicone, or urethane. The present invention is not restricted or limited by the material and property of the sealing portion 260.

For example, the sealing portion 260 may be manufactured separately from the separator 200 and then attached to (accommodated on) the separator 200. According to various exemplary embodiments of the present invention, the sealing portion may be provided on the separator by applying or transferring the elastic material or by performing a printing process using the elastic material. Alternatively, the sealing portion may be provided on the separator by injection molding.

The first sealing member 262 may be provided around the manifold flow path 230 and disposed on one surface 200a of the separator 200. The entrance/exit ports 262a through which water or hydrogen flows in and out may be disposed at one side of the first sealing member 262.

The first sealing member 262 may be disposed on the manifold flow path 230 through which water is introduced and discharged among the plurality of manifold flow paths 230.

For example, the water introduced into the manifold flow path 230 may be supplied to the first channels 210 through the entrance/exit ports 262a of the first sealing member 262.

The second sealing member 264 may be provided around the manifold flow path 230, disposed on the other surface 200b of the separator 200, and configured to seal the manifold flow path 230 on the other surface 200b of the separator 200.

For reference, the manifold flow path 230, to which the first sealing member 262 and the second sealing member 264 are applied, may be variously changed in position and number in accordance with required conditions and design specifications. The present invention is not restricted or limited by the position of the manifold flow path 230 and the number of manifold flow paths 230 to which the first sealing member 262 and the second sealing member 264 are applied.

Figure 7:
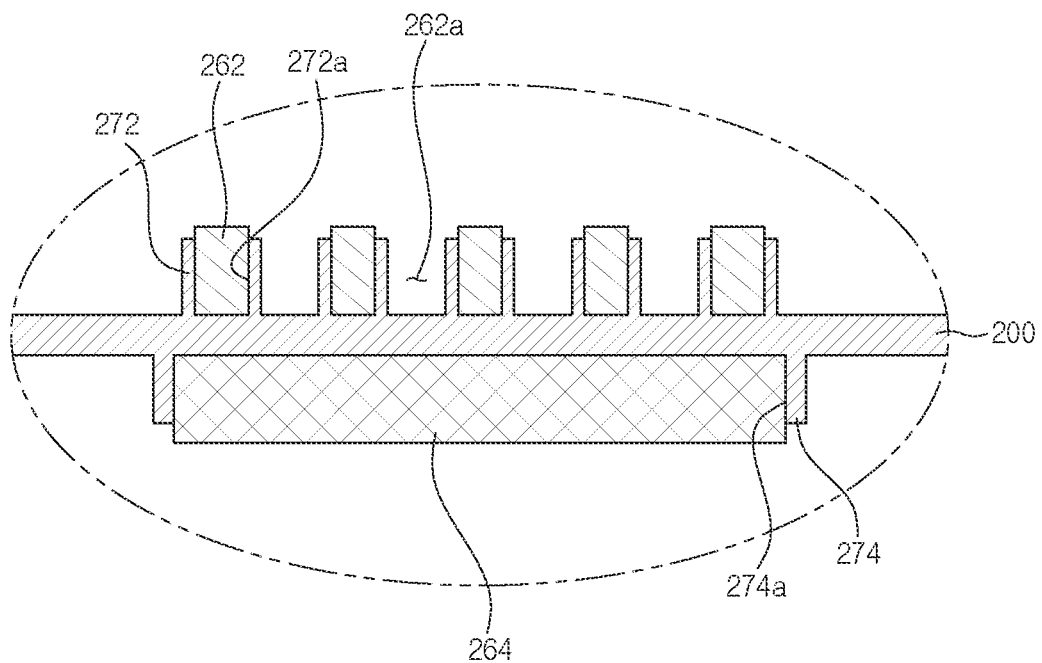
FIG. 7 is a cross-sectional view taken along line A-A in FIG. 6.

For example, referring to FIG. 7, based on the specific manifold flow path 230, the first sealing member 262 may be provided around the manifold flow path 230 and disposed on the upper surface (based on FIG. 7) of the separator 200. The second sealing member 264 may be provided around the manifold flow path 230 and disposed on the lower surface (based on FIG. 7) of the separator 200.

Figure 8:
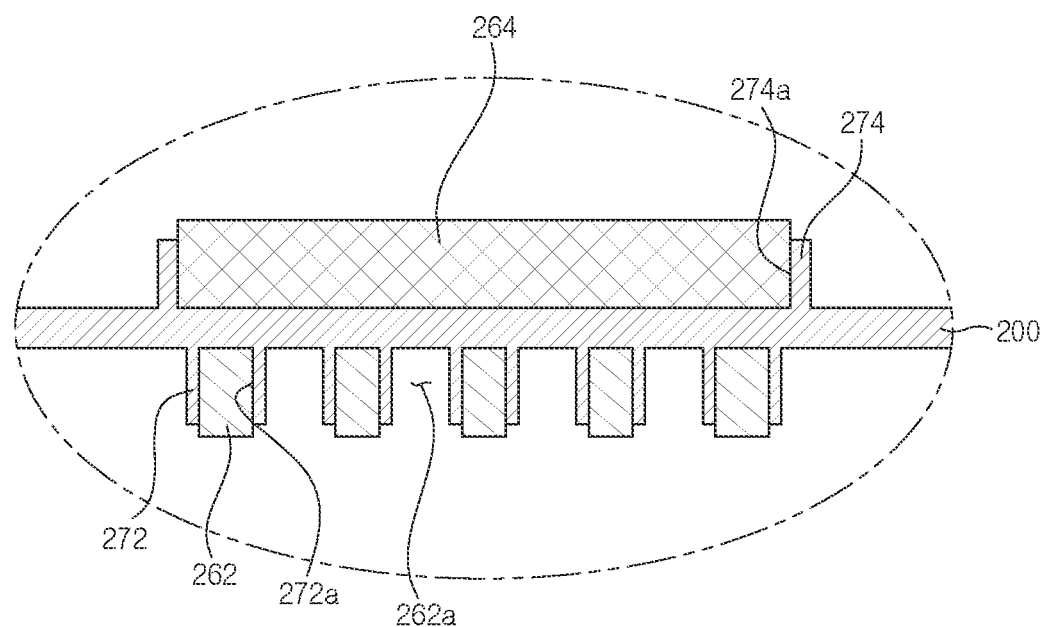
FIG. 8 is a cross-sectional view taken along line B-B in FIG. 6.

As various exemplary embodiments of the present invention, referring to FIG. 8, based on another specific manifold flow path 230, the first sealing member 262 may be provided around the manifold flow path 230 and disposed on the lower surface (based on FIG. 8) of the separator 200. The second sealing member 264 may be provided around the manifold flow path 230 and disposed on the upper surface (based on FIG. 8) of the separator 200.

Since the first sealing member 262 is disposed on one surface (or the other surface) of the separator 200 and the second sealing member 264 disposed on the other surface (or one surface) of the separator 200 as described above, the water supplied to the manifold flow path 230 may be introduced into the first channels 210 (one surface of the separator) through the entrance/exit ports 262a of the first sealing member 262, but the water introduced into the manifold flow path 230 may be prevented from being introduced into the second channels 220 (the other surface of the separator). Likewise, since the second sealing member 264 configured to seal the periphery of the manifold flow path 230 is disposed on the other surface of the separator 200, it is possible to prevent the hydrogen in the second channels 220 from being introduced into the first channels 210.

Figure 9:
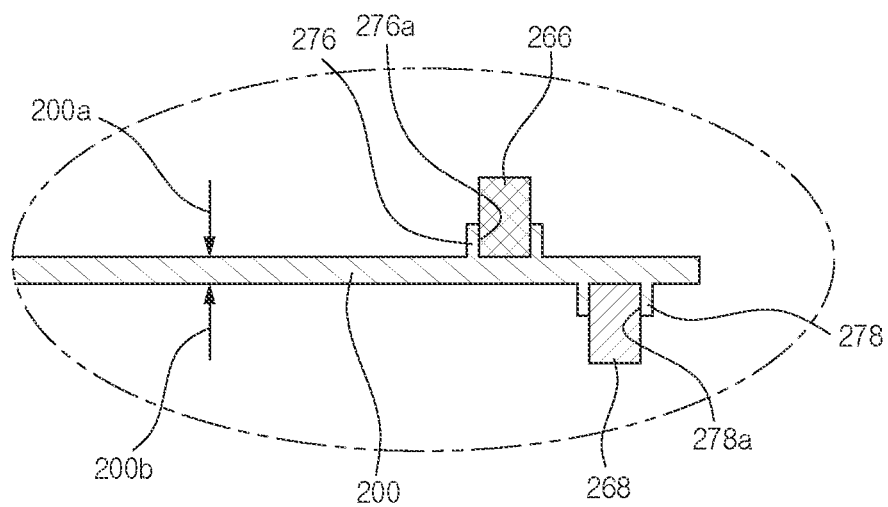
FIG. 9 is a cross-sectional view taken along line C-C in FIG. 6.

The first edge sealing member 266 may be provided along the edge portion (e.g., an outermost peripheral edge portion) of the separator 200 and disposed on one surface 200a of the separator 200 (e.g., the upper surface of the separator based on FIG. 9). The first channels 210 may be sealed by the first edge sealing member 266.

The second edge sealing member 268 may be provided along the edge portion (e.g., an outermost peripheral edge portion) of the separator 200 and disposed on the other surface 200b of the separator 200 (e.g., the lower surface of the separator based on FIG. 9). The second channels 220 may be sealed by the second edge sealing member 268.

According to the exemplary embodiment of the present invention, the electrochemical device 10 may include a support portion 270 disposed on the separator 200 and configured to support the sealing portion 260 with respect to the separator 200.

The support portion 270 is configured to stably support an arrangement state of the sealing portion 260 with respect to the separator 200.

Since the support portion 270 is provided as described above, the arrangement state of the sealing portion 260 may be stably maintained even though a pressure (e.g., a water supply pressure or a fastening pressure) applied to the sealing portion 260 increases. Therefore, it is possible to obtain an advantageous effect of minimizing the withdrawal and deformation of the sealing portion 260 and improving the safety and reliability.

The support portion 270 may have various structures configured for supporting the sealing portion 260, and the present invention is not restricted or limited by the structure of the support portion 270.

For example, the support portion 270 may include a first support protrusion 272 disposed on one surface 200a of the separator 200 and configured to support the first sealing member 262, a second support protrusion 274 disposed on the other surface 200b of the separator 200 and configured to support the second sealing member 264, a first edge support protrusion 276 disposed on one surface 200a of the separator 200 and configured to support the first edge sealing member 266, and a second edge support protrusion 278 disposed on the other surface 200b of the separator 200 and configured to support the second edge sealing member 268.

The first support protrusion 272 may have various structures configured for supporting the first sealing member 262.

For example, the first support protrusion 272 may have a shape corresponding to a shape of the first sealing member 262 and continuously support the first sealing member 262 along the periphery of the first sealing member 262.

A first seating groove 272a may be provided in the first support protrusion 272, and the first sealing member 262 may be accommodated in the first seating groove 272a. An internal periphery and an external periphery of the first sealing member 262 may be supported by the first support protrusion 272 in the state in which the first sealing member 262 is accommodated in the first seating groove 272a.

The second support protrusion 274 may have various structures configured for supporting the second sealing member 264.

For example, the second support protrusion 274 may have a shape corresponding to a shape of the second sealing member 264 and continuously support the second sealing member 264 along the periphery of the second sealing member 264.

A second seating groove 274a may be provided in the second support protrusion 274, and the second sealing member 264 may be accommodated in the second seating groove 274a. An internal periphery and an external periphery of the second sealing member 264 may be supported by the second support protrusion 274 in the state in which the second sealing member 264 is accommodated in the second seating groove 274a.

The first edge support protrusion 276 may have various structures configured for supporting the first edge sealing member 266.

For example, the first edge support protrusion 276 may have a shape corresponding to a shape of the first edge sealing member 266 and continuously support the first edge sealing member 266 along the periphery of the first edge sealing member 266.

A first edge seating groove 276a may be provided in the first edge support protrusion 276, and the first edge sealing member 266 may be accommodated in the first edge seating groove 276a. An internal periphery and an external periphery of the first edge sealing member 266 may be supported by the first edge support protrusion 276 in the state in which the first edge sealing member 266 is accommodated in the first edge seating groove 276a.

The second edge support protrusion 278 may have various structures configured for supporting the second edge sealing member 268.

For example, the second edge support protrusion 278 may have a shape corresponding to a shape of the second edge sealing member 268 and continuously support the second edge sealing member 268 along the periphery of the second edge sealing member 268.

A second edge seating groove 278a may be provided in the second edge support protrusion 278, and the second edge sealing member 268 may be accommodated in the second edge seating groove 278a. An internal periphery and an external periphery of the second edge sealing member 268 may be supported by the second edge support protrusion 278 in the state in which the second edge sealing member 268 is accommodated in the second edge seating groove 278a.

The first support protrusion 272 may be disposed in an external region of the second support protrusion 274 so as not to overlap the second support protrusion 274, and the first edge support protrusion 276 may be disposed in an external region of the second edge support protrusion 278 so as not to overlap the second edge support protrusion 278.

In the instant case, the configuration in which the first support protrusion 272 is disposed in the external region of the second support protrusion 274 so as not to overlap the second support protrusion 274 may mean that the first support protrusion 272 and the second support protrusion 274 do not overlap each other in a plan view as illustrated in FIG. 5. For example, the second support protrusion 274 may have a larger size than the first support protrusion 272, and the first support protrusion 272 may be disposed in an internal region of the second support protrusion 274.

Furthermore, the configuration in which the first edge support protrusion 276 is disposed in the external region of the second edge support protrusion 278 so as not to overlap the second edge support protrusion 278 may mean that the first edge support protrusion 276 and the second edge support protrusion 278 do not overlap each other in a plan view as illustrated in FIG. 5. For example, the second edge support protrusion 278 may have a larger size than the first edge support protrusion 276, and the first edge support protrusion 276 may be disposed in an internal region of the second edge support protrusion 278.

As described above, the first support protrusion 272 does not overlap the second support protrusion 274, and the first edge support protrusion 276 does not overlap the second edge support protrusion 278. Therefore, the first support protrusion 272, the first edge support protrusion 276, the second support protrusion 274, and the second edge support protrusion 278 may be provided together or simultaneously on one surface 200a and the other surface 200b of the separator 200 by the press processing.

According to the exemplary embodiment of the present invention as described above, it is possible to obtain an advantageous effect of simplifying the structure and the manufacturing process.

According to the exemplary embodiment of the present invention, it is possible to implement both the cathode separator and the anode separator using the single type of separator having the same structure.

Furthermore, according to the exemplary embodiment of the present invention, it is possible to obtain an advantageous effect of reducing the weight and size of the product and decreasing manufacturing costs.

Furthermore, according to the exemplary embodiment of the present invention, it is possible to obtain an advantageous effect of minimizing the position deviation of the separator and improving safety and reliability.

Furthermore, according to the exemplary embodiment of the present invention, it is possible to obtain an advantageous effect of improving the structural rigidity of the separator and minimizing deformation of and damage to the separator.

Furthermore, according to the exemplary embodiment of the present invention, it is possible to obtain an advantageous effect of inhibiting the occurrence of contact resistance of the separator and improving the mobility of electrons and the efficiency.

Furthermore, according to the exemplary embodiment of the present invention, it is possible to obtain an advantageous effect of inhibiting deformation of and damage to the sealing member and ensuring the sealability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electrochemical apparatus comprising:
reaction layers including a membrane electrode assembly (MEA);
separators respectively stacked on two opposite surfaces of each reaction layer, wherein each separator includes first channels disposed on a first surface thereof along a first direction and second channels disposed on a second surface thereof along the first direction;
a plurality of manifold flow paths disposed at a first end portion and a second end portion of each separator with the first channels or the second channels interposed therebetween;
a sealing portion configured to seal a portion between each reaction layer and each separator; and
a support portion disposed on each separator and configured to support the sealing portion with respect to each separator,
wherein the sealing portion includes:
a first sealing member provided around the manifold flow paths, disposed on the first surface of each separator, and having an entrance/exit port;
a second sealing member provided around the manifold flow paths and disposed on the second surface of each separator;
a first edge sealing member provided along an edge portion of each separator and disposed on the first surface of each separator; and
a second edge sealing member provided along the edge portion of each separator and disposed on the second surface of each separator,
wherein the support portion includes:
a first support protrusion disposed on the first surface of each separator and configured to support the first sealing member;
a second support protrusion disposed on the second surface of each separator and configured to support the second sealing member;
a first edge support protrusion disposed on the first surface of each separator and configured to support the first edge sealing member; and
a second edge support protrusion disposed on the second surface of each separator and configured to support the second edge sealing member, and
wherein the electrochemical apparatus further including:
a first seating groove which is provided in the first support protrusion and in which the first sealing member is accommodated;
a second seating groove which is provided in the second support protrusion and in which the second sealing member is accommodated;

a first edge seating groove which is provided in the first edge support protrusion and in which the first edge sealing member is accommodated; and a second edge seating groove which is provided in the second edge support protrusion and in which the second edge sealing member is accommodated.

2. The electrochemical apparatus of claim 1, wherein the separators are disposed such that the first channels or the second channels overlap each other with each reaction layer interposed therebetween.

3. The electrochemical apparatus of claim 1, wherein each separator includes:

a first protrusion pattern protruding from the second surface of each separator; and a second protrusion pattern protruding from the first surface of each separator, and wherein the first channels are defined in the first protrusion pattern, and the second channels are defined in the second protrusion pattern.

4. The electrochemical apparatus of claim 3, wherein the first protrusion pattern is disposed in an external region of the second protrusion pattern so as not to overlap the second protrusion pattern.

5. The electrochemical apparatus of claim 3, wherein the first protrusion pattern and the second protrusion pattern are alternately disposed in a predetermined reference direction to define a continuous waveform.

6. The electrochemical apparatus of claim 3, wherein the first protrusion pattern and the second protrusion pattern are integrated with each separator by partially processing a portion of each separator.

7. The electrochemical apparatus of claim 1, wherein the plurality of manifold flow paths is symmetric with respect to a vertical reference line passing through a center portion of each separator.

8. The electrochemical apparatus of claim 1, wherein the plurality of manifold flow paths is symmetric with respect to a horizontal reference line passing through a center portion of each separator.

9. The electrochemical apparatus of claim 1, further including:

a first branch flow path protrusion pattern disposed on the first surface of each separator and configured to define first branch flow paths between the first channels and the manifold flow paths; and a second branch flow path protrusion pattern disposed on the second surface of each separator and configured to define second branch flow paths between the second channels and the manifold flow paths.

10. The electrochemical apparatus of claim 9, wherein the first branch flow path protrusion pattern is disposed in an external region of the second branch flow path protrusion pattern so as not to overlap the second branch flow path protrusion pattern.

11. The electrochemical apparatus of claim 1, wherein the first support protrusion is disposed in an external region of the second support protrusion so as not to overlap the second support protrusion, and the first edge support protrusion is disposed in an external region of the second edge support protrusion so as not to overlap the second edge portion support protrusion.

12. The electrochemical apparatus of claim 1, wherein each reaction layer further includes a gas diffusion layer being in contact with a first surface of the membrane electrode assembly and a porous transport layer being in contact with a second surface of the membrane electrode assembly.

13. The electrochemical apparatus of claim 12, wherein one of the separators is stacked on the gas diffusion layer of each reaction layer and another of the separators is stacked on the porous transport layer of each reaction layer, wherein the membrane electrode assembly is disposed between the gas diffusion layer of each reaction layer and the porous transport layer of each reaction layer, wherein first channels of the one of the separators are in direct contact with the gas diffusion layer of each reaction layer, and wherein first channels of another of the separators are in direct contact with the porous transport layer of each reaction layer.

* * * * *